Feb. 20, 1968   J. P. LONGWELL ETAL   3,369,943
GELLED SOLID ROCKET PROPELLANT REINFORCED
WITH UNORIENTED MICROFIBERS
Filed Dec. 28, 1959
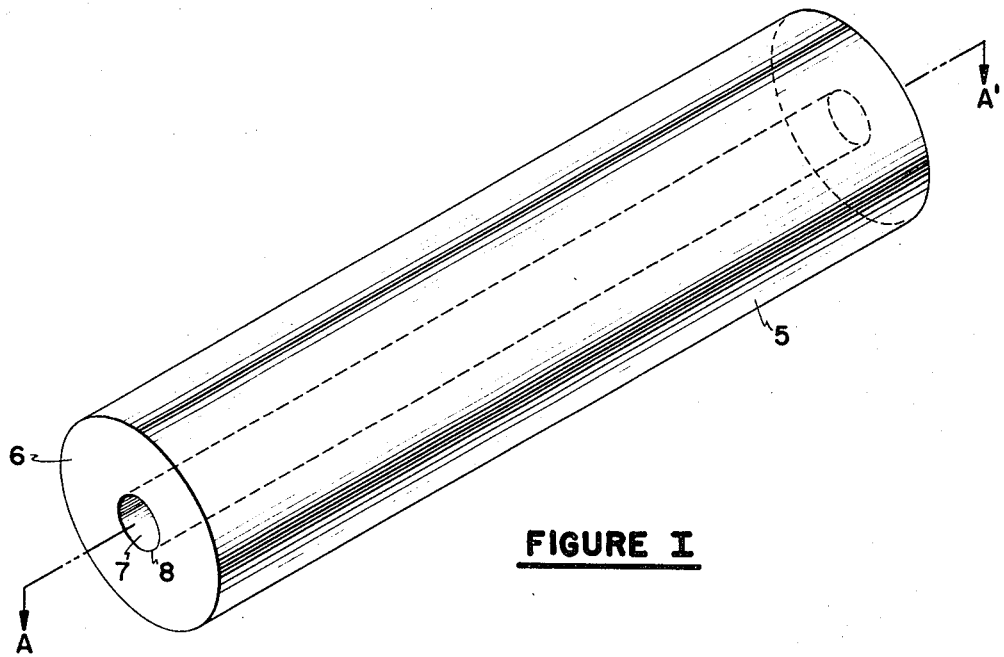
FIGURE I
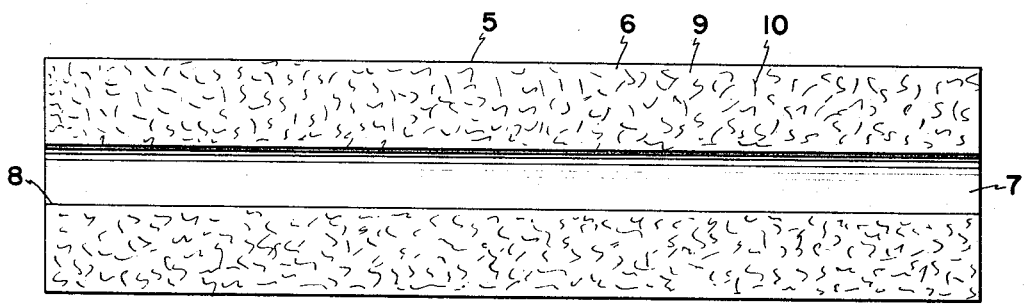
FIGURE II
Herman Bieber
John P. Longwell    Inventors
By R. D. Manahan
Patent Attorney

United States Patent Office 3,369,943
Patented Feb. 20, 1968

3,369,943
GELLED SOLID ROCKET PROPELLANT REINFORCED WITH UNORIENTED MICROFIBERS
John P. Longwell, Scotch Plains, and Herman Bieber, Kenilworth, N.J., assignors to Esso Research and Engineering Company, a corporation of Delaware
Filed Dec. 28, 1959, Ser. No. 862,415
7 Claims. (Cl. 149—18)

The present invention relates to a novel propellant useful in the field of rocketry and the preparation thereof. More specifically, it concerns a thickened or gelled liquid rocket propellant in which unoriented fibers are imbedded to impart strength to the propellant components. In one aspect of the invention, the fibers comprise a major part of the fuel, while in another aspect the fibers have only a small fuel value and are principally used to strengthen the propellant system against cracking during the combustion stage.

The present invention is applicable to rocket propulsion devices which are commonly designated pure rockets. The rocket propulsion device is a rigid container for matter and energy so arranged that a portion of the matter can absorb the energy in kinetic form and subsequently eject it in a specified direction. The term "pure rocket" is used herein to designate a rocket in which the means producing the thrust does not make use of the surrounding atmosphere. The rocket is propelled by igniting the propellant in the combustion chamber which usually comprises an oxidizing agent and a fuel to produce burning and thereby cause the release of energy at a high but controllable rate from the combustion chamber.

There are a number of liquid oxidizing agents, which when combined with a suitable fuel, will produce a propellant having a high specific impulse. However, many difficulties have been encountered in preparing a satisfactory propellant of this type because the fuel is generally a solid, e.g. powdered aluminum, which when mixed with the liquid oxidizing agent forms a thick mud-like mass that is not suitable as such for use in pure rocket devices. Recently, plastisols have been developed which have improved strength. These may be prepared by admixing polyvinyl chloride, a plasticizer oil, such as dibutyl phthalate or sebacate, an oxidizing agent and a solid fuel, heating the resulting mud-like mixture to about 175° C. and thereafter permitting the heated mass to cool in a mold. While the plastisols are rigid they usually are deficient in tensile strength and therefore are not suitable for rockets in which high pressures occur in the combustion chamber during the burning stage.

It has now been found that the strength of plastiosols, gels or other thickened liquids used in propellant systems can be greatly improved by imbedding unoriented fibers in them. The fibers are usually in the form of a felt or wool. The strands are generally woven in a random fashion to form a three-dimensional body having considerable space between the fibers for occupation by the thickened liquid component of the propellant. The randomly woven fibers are preferably small in diameter and possess irregular cross-sections. The irregular surface of the fiber presents a greater absorption area which allows the incorporation of larger amounts of liquid into the network of fibers. While the fibers will imbibe a considerable amount of liquid by capillary action, it is usually necessary to gel or thicken the liquid as well because of the high stresses encountered in rocket firing.

The fibers may comprise any substance which will produce a felt-like mass or wool having a tensile strength of at least 50 p.s.i. It may be made from organic or inorganic substances and can be polymeric or metallic in nature. Suitable high molecular weight organic polymers include cellulose, nylon (copolymer of hexamethylenediamine and adipic acid), Orlon (polyacrylonitrile), polyethylene, polypropylene, polyurethane, etc. The viscosity average molecular weight of these polymers is generally about 50,000 to 2,000,000. The upper limit is controlled by elongation which should be about 10 to 40%; the lower limit is controlled by tensile strength which should be above 50 p.s.i. The organic fibers may or may not be modified by the addition of oxidizer groups such as $NO_2$, $NF_2$, etc. Among the inorganic materials which may be employed in the fibers are glass and metals, such as steel, magnesium, aluminum, beryllium and boron. Of the foregoing substances, aluminum, beryllium and boron are preferred because of their high fuel values.

Unless the fiber serves a dual function, that is to say, it is both a strengthening material and a fuel, the amount of the fiber used in the propellant should be kept to a minimum. For example, while a propellant prepared in accordance with the present invention may contain up to 20 wt. percent or more of aluminum wool, a propellant should have no more than about 5 wt. percent of polyethylene fibers or glass fibers, in it since these substances have little fuel value. Of course, there should always be a sufficient amount of the fiber in the composition to impart the desired amount tensile strength. Experimental work indicates that the minimum amount of fiber is about 0.5 or 1 wt. percent.

While it is desirable to keep the low fuel value fiber content at a concentration which does not exceed 5 wt. percent, it may be necessary in some instances to sacrifice thrust for additional strength. In such cases, low fuel value organic or inorganic fibers may occupy as much as 10 wt. percent of the propellant.

The fibers used in the present invention may be prepared by any of the well known techniques. For example, in the case of glass fibers a soda-lime-silica glass or borosilicate glass may be melted and drawn into fibers. Glass compositions of the types indicated are familiar to those skilled in the art and numerous formulations are available. A typical borosilicate glass formulation is as follows.

| Components: | Wt. percent |
|---|---|
| Silica | 53.5 |
| Lime | 17.5 |
| Magnesia | 4.5 |
| Aluminum | 14.5 |
| Boric oxide | 10.0 |

It will be understood that other glass compositions containing the above or other ingredients may also be utilized in the preparation of the glass fibers used herein.

Metal wools can be made by cutting or chafing wire, or stretching the heated metal wire or strand to produce a fiber having a narrow diameter. Polypropylene, polyethylene, nylon and Orlon may be made into thread-like fibers by forcing melted polymer through small orifices under high pressures.

Methods of making felts are described in the literature. For instance, the glass or organic fibers may be admixed with a diluent or solvent, and sprayed through a nozzle on a porous surface, such as cloth or absorbent paper, to produce a felt-like substance in which the fibers are randomly intertwined. The felted mass produced in this manner generally has only two dimensional strength. Third dimensional strength may be obtained by running fibers through the mass perpendicular to the fibers. This operation is known as "needling." The felt can also be strengthened by dipping it in a size or glue solution, thereby causing crossing fibers to adhere at points of contact. For fusible materials, an incipient melting at high heat flux will also join the fibers. The thickness or diameter of the fiber is an important property and should not exceed 100 microns and preferably is 10 microns or less, e.g., 0.1 to 5 microns.

The thickened liquid portion of the propellant usually comprises a liquid oxidizer and a gelling or thickening agent. It may also contain a solid fuel, such as powdered aluminum, powdered beryllium, hexanitroethane, hydrazine diborane, etc. or liquid fuel, such as hydrazine, tetranitromethane, 1,2,3-tris (difluoroamine) propane, chlorine trifluoride, ethyl decaborane, etc. The preferred metal fuels, including their hydrides, are found in Groups II and III of the Periodic Chart of Elements on pages 56–57 of "Handbook of Chemistry" by N. A. Lange, 8th edition. The fuel, including the fibrous network if it has fuel value, should comprise about 10 to 30 wt. percent of the propellant composition. The oxidizing agent should also be present in substantial amounts, e.g., about 70 to 90 wt. percent. Among the liquid oxidizing agents which may be used in accordance with the invention are tetranitromethane and a polydifluoramino organic compound containing an $NF_2$ group linked to each carbon atom as in the tris (difluoramino) propane mentioned. Of course, each compound may contain "fuel" and "oxidizer" internally, although one or the other component will predominate, as the oxygen in tetranitromethane.

Sometimes it is desirable to use a solid oxidizing agent, such as lithium perchlorate or nitronium perchlorate with a liquid fuel such as hydrazine. In general, the oxidizing agents contain nitrogen or oxygen and react rapidly with the fuel to produce large amounts of energy. In some instances, both the oxidizer and the fuel in the thickened composition are liquids. In such cases, it is preferred to use liquids that are miscible.

The thickening agent should comprise only a small proportion of the propellant composition if it has little value insofar as combustion is concerned. Where it is a substance having fuel value, e.g., boron black, it may be used in large amounts. However, with regard to agents having little or no fuel value its concentration should not exceed 20 wt. percent and is preferably not more than about 5 wt. percent, e.g., 1 to 3 wt. percent. Of course, some thickening agents are superior to others and may be employed in amounts below 1 wt. percent. The only requirement is that sufficient thickening agent be employed to produce a composition which will remain in the fibrous network and not seep out under mild pressure. The thickened composition should have a certain affinity for the fibers in the network so that there is an attraction between the fibers and the thickened liquid of such a magnitude that the latter is held firmly on the surface of the fibers. Suitable thickening agents include carboxymethyl cellulose, polyvinyl chloride, natural gums, alkaline or alkali metal soaps, e.g., calcium stearate, n-stearoyl-para-aminophenol, thixcin, 4,4-bis-(4-methyl-phenyl) 1,2,3-cyclohexane-triol. The cyclohexane-triol, which is a diaryldesoxy-ketitol, is particularly effective when nitro-paraffins, such as tetranitromethane, are used as the oxidizing agent.

In addition to the above-mentioned thickening agents, gelation or thickening will occur when solids are added that possess very high specific surface area. Such materials include silica fines, carbon black (especially acetylene black), and ultrafine metal powders or platelets. The last-named are preferred over silica because of their higher fuel value. Boron black, made by shock pyrolysis of diborane is a particularly attractive thickening agent.

From the foregoing it is apparent that any substance which is capable of producing a semi-solid or gel from the liquid oxidizing agents and/or fuels commonly used in rocket propellant systems may be employed to produce the novel propellants described herein. Broadly speaking, the organic thickening agents may be described as substances which are capable of swelling and/or occluding the liquid components in the propellant. This may be accomplished either by employing a network of molecular chains throughout the thickened liquid or by merely making it so viscous that it has the properties of a semi-solid.

In addition to using the thickening agents described above, curing agents are useful when unsaturated low molecular weight polymers are employed to give the liquid components body. A low molecular weight hydrocarbon polymer, such as butyl rubber, which is a copolymer comprising a major proportion of isobutylene and a minor proportion of isoprene, or polybutadiene, can be used in place of gelling agents. The polymer-containing composition may be thickened by adding about 1 to 10 wt. percent (based on the polymer) curing agent such as sulfur, sulfur-bearing substances, para-quinone dioxime or polyamino compounds.

The fibrous network, which supports the propellant system, may be filled with the thickened liquid component by any suitable technique. For instance, it may be immersed in the thickened liquid for a sufficient period of time, e.g., a few minutes to several hours, to partly or completely fill the openings in the network with the thickened liquid. This may be carried out at room temperature and atmospheric pressure but reduced pressure, e.g., 200 to 500 mm., is preferred to promote de-aeration of the propellant mass. If the thickened liquid is highly viscous it may be necessary to employ pressure to force the liquid into the network. The rocket grain may then be built up by sectioning together layers of the impregnated felt.

Another method of imbedding the fibers in the thickened liquid is pouring the liquid into a vessel, e.g., the reaction chamber of a rocket, which contains the felted fibrous material and thereafter heating the mixture to an elevated temperature, e.g., 100 to 200° C. to cause the thickening agent to swell or cure. Upon cooling the heated mass, a rigid propellant having structure and good strength is obtained. A mandrel having the desired design, e.g., star-shaped, may be placed in the center of the burning chamber prior to adding the thickened liquid to provide a burning surface when the propellant has gelled.

In a preferred embodiment, a liquid oxidizing agent is admixed with a small amount of a thickening or gelling agent and the resulting mixture is incorporated in a felted fiber, such as a boron wool, that has a high fuel value. Thereafter the filled felted fabric is heated to swell the thickening agent and then it is cooled to produce a body having good structure which does not ooze liquid under acceleration forces normally encountered in rocket launchings. A propellant composition prepared in the foregoing manner preferably has a tensile strength of about 40 to 300 p.s.i.

Turning now to the drawing in which FIGURE I is a perspective view of a rocket propellant or motor containing a gelled liquid occluded in a metal fiber network; and FIGURE II is a cross-sectional view of the rocket motor depicted in FIGURE I which has been cut along line A–A′.

The rocket motor 5 shown in FIGURE I of the drawing is a cylindrical shaped body having a circular conduit 7 in its center travelling along its longitudinal axis. The inner surface 8 of walls 6 of the rocket motor 5 form said conduit 7. Of course, conduit 7 need not be circular but may be any suitable design, such as star-shaped, cruciform, etc. In fact, it is not necessary to have a conduit in the rocket motor since in some instances it is desirable to permit the motor to burn axially in a cigarette fashion. The walls 6 contain a fibrous network and the gelled propellant liquid. The inner surface 8, which defines the conduit, presents a large area of combustible material which allows rapid burning upon ignition by a suitable means, i.e. an electric match.

FIGURE II, a longitudinal cross-section of rocket motor 5, shows that walls 6 contain unoriented felt-like fibers 10 imbedded in a gel-like substance 9. In this embodiment, the fibers 10 are boron threads having a diameter of 0.1 to 5 microns. The gel-like substance 9 comprises tetranitromethane thickened with a sub-micron size silica dust.

The rocket motor described above with reference to the drawing can be prepared as follows:

Polycrystalline boron rods may be formed by the deposition of boron on a tungsten filament or other conductive support. The boron is generated by pyrolyzing $BBr_3$ in $H_2$ atmosphere. Fabrication of glassy boron rods by this method is well known (Journal of Physical Chemistry, 63, 311 (1959)). The glassy boron rods are heated and drawn into filaments in a manner similar to the drawing of tungsten wires from rods. Chopped up filaments with lengths ranging from 0.25 to 3 inches are formed into a matted felt by the techniques already described. The felt can be "cross-linked" by electrically heating it to its sintering temperature, if desired.

Silica dust (5 wt. percent) having a particle size of less than 1 micron is added to tetranitromethane at 100° C. and the felt is impregnated with the fluid oxidizer-silica mixture by submersion. On cooling, a firm gel is set up within the fiber network. Polar liquids are more difficult to gel than non-polar liquids. The foregoing composition may be described by the following formula.

| Components: | Weight percent |
|---|---|
| Boron fiber | 19.9 |
| Tetranitromethane (TNM) | 76.3 |
| Silica | [1] 3.8 |

[1] 5% on TNM.

The glassy boron fibers have a tensile strength of 230,000 to 350,000 p.s.i. and when ignited burn evenly in tetranitromethane. It is calculated that the motor described has a specific impulse of 260 sec.$^{-1}$. The following is an example of a rocket motor in which the strengthening material has a small fuel value and therefore serves only one function in the rocket motor.

| Composition: | Weight percent |
|---|---|
| Glass wool | 2.5 |
| Tetranitromethane (TNM) | 60.4 |
| Al powder ($D_p<1\mu$) | 31.1 |
| 4,4-bis-(4-methyl - phenyl) 1,2,3-cyclohexane-triol | 6.0 |
| | 100.0 |

The preparation of the TNM-triol gel is fully described in U.S. Patent 2,891,852. In the present modification the Al fines are added to the hot fluid gel-TNM mixture and this is used to impregnate the glass wool. The cooled reinforced gel has essentially the strength of the glass wool itself, about 150 p.s.i. in the present case. The above mixture burns smoothly when ignited. It has a calculated specific impulse of 270 sec.$^{-1}$.

It is not intended to restrict the present invention to the foregoing embodiments, but rather it should only be limited by the appended claims in which it is intended to claim all the novelty inherent in the invention.

What is claimed is:

1. A rocket propellant having a tensile strength above 50 p.s.i. which comprises a felted network of unoriented fibers having a diameter of about 0.1 to 100 microns imbedded in a thickened liquid oxidizing agent which is about 60 to 90 wt. percent of the propellant and is selected from the group consisting of tetranitromethane and a polydifluoramino organic compound containing an $NF_2$ group linked to each carbon atom, mixed with about 10 to 30 wt. percent of finely-divided solid fuel from the group consisting of beryllium, boron, aluminum and magnesium, said liquid oxidizing agent being thickened into a gel by a thickening agent which is 1 to 5 wt. percent of the propellant, said imbedded fibers having a tensile strength of above strength of above 50 p.s.i. and being present in a proportion of about 1 to 30 wt. percent including said fuel in the form of fibers, but including less than 5 wt. percent of low fuel-value fibers.

2. A rocket propellant according to claim 1 in which the low fuel-value fibers are glass wool.

3. A rocket propellant having a tensile strength above 50 p.s.i. which comprises a felted network of unoriented boron fibers having a diameter of 0.1 to 5 microns and a tensile strength above 50 p.s.i. imbedded in a mass of tetranitromethane thickened from a liquid to a firm gel by 1 to 5 wt. percent of a thickening agent having low fuel value, said imbedded boron fibers being present to impart the tensile strength to the propellant and as finely-divided solid fuel in a proportion of about 10 to 30 wt. percent of the propellant, and said liquid oxidizing agent being in the proportion of about 60 to 90 wt. percent of the propellant.

4. A rocket propellant according to claim 3 in which the boron fibers are 19.9 wt. percent, the tetranitromethane is 76.3 wt. percent, and silica dust having a particle size of less than 1 micron is the thickening and gelling agent present in the proportion of 3.8 wt. percent.

5. A rocket propellant having a tensile strength of at least 50 p.s.i. which comprises a glass wool network having a fiber diameter of 0.1 to 5 microns and a tensile strength above 50 p.s.i. imbedded in a thickened gel of liquid tetranitromethane amounting to about 60 to 90 wt. percent of the propellant mixed with about 10 to 30 wt. percent of solid fuel powder selected from the group consisting of beryllium, boron, aluminum and magnesium powders with about 1 to 5 wt. percent of an agent which thickens and gels the liquid tetranitromethane but which has low fuel value, the glass wool fibers being present in a proportion of about 1 to 5 wt. percent of the propellant.

6. A rocket propellant composition according to claim 5 consisting of 2.5 wt. percent of glass wool, 60.4 wt. percent of tetranitromethane, 31.1 wt. percent of aluminum powder, and thickening agent.

7. A process for strengthening a rocket propellant containing as fuel about 10 to 30 wt. percent of the finely-divided metal selected from the group consisting of beryllium, boron, aluminum and magnesium and as oxidizing agent for the fuel a gelled liquid selected from the group consisting of tetranitromethane and a polydifluoramino organic compound containing an $NF_2$ group linked to each carbon atom, said liquid oxidizing agent being a major proportion of the propellant which comprises mixing the liquid oxidizing agent with a thickening agent admixed in a proportion of about 1 to 5 wt. percent of the propellant, heating the resulting mixture to a temperature of about 100° to 200° C., imbedding a felted network of unoriented fibers having a diameter of 0.1 to 100 microns and a tensile strength above 50 p.s.i. in the heated mixture of the liquid oxidizing agent and thickening agent, said fibers being proportioned to an amount of about 1 to 30 wt. percent of the propellant including said fuel, but including less than 5 wt. percent of low fuel-value fibers, and thereafter cooling the gelled liquid oxidizing agent having the imbedded fibers and admixed finely-divided metal fuel in the form selected from the class consisting of powder and fibers.

References Cited

UNITED STATES PATENTS

| 1,530,692 | 3/1925 | Paulus. | |
| 2,570,990 | 10/1951 | Southern et al. | |
| 2,574,466 | 11/1951 | Clay et al. | |
| 2,712,989 | 7/1955 | Maisner | 52—.5 |
| 2,921,846 | 1/1960 | Novak | 52—.5 |
| 2,068,873 | 1/1937 | Scheibinger et al. | 44—7 |
| 2,530,489 | 11/1950 | Van Loenen | 52—24 |
| 2,971,097 | 2/1961 | Corbett. | |

BENJAMIN R. PADGETT, *Primary Examiner.*

LEON D. ROSDOL, OSCAR R. VERTIZ, *Examiners.*